(No Model.)

H. M. CROMER.
WAGON AXLE BEARING.

No. 599,166. Patented Feb. 15, 1898.

WITNESSES:
Paul Johad
H. L. Reynold

INVENTOR
H. M. Cromer
BY
Munn
ATTORNEYS.

UNITED STATES PATENT OFFICE.

HENRY M. CROMER, OF ANDERSON, SOUTH CAROLINA.

WAGON-AXLE BEARING.

SPECIFICATION forming part of Letters Patent No. 599,166, dated February 15, 1898.

Application filed April 29, 1897. Serial No. 634,372. (No model.)

*To all whom it may concern:*

Be it known that I, HENRY M. CROMER, of Anderson, in the county of Anderson and State of South Carolina, have invented a new and Improved Wagon-Axle Bearing, of which the following is a full, clear, and exact description.

My invention relates to an improvement in bearings for wagon-axles, having for its object the utilization of old thimble-skeins, by which they may be made to fit closely upon the axle, as well as to provide a new construction which may be placed upon the wagon when originally built.

The invention comprises a conical sleeve attached to each end of the spindle-bearing and adjustable in either direction, by which the spindle may be made to snugly fit the sleeve at all times and by which the position of the hub upon the axle may be adjusted so as to keep the tread of the wagon constant.

The invention consists in the construction and combination of the several parts, as will be fully described hereinafter and pointed out in the appended claims.

Reference is to be had to the accompanying drawings, forming a part of this specification, in which similar characters of reference indicate corresponding parts in both the views.

Figure 1:
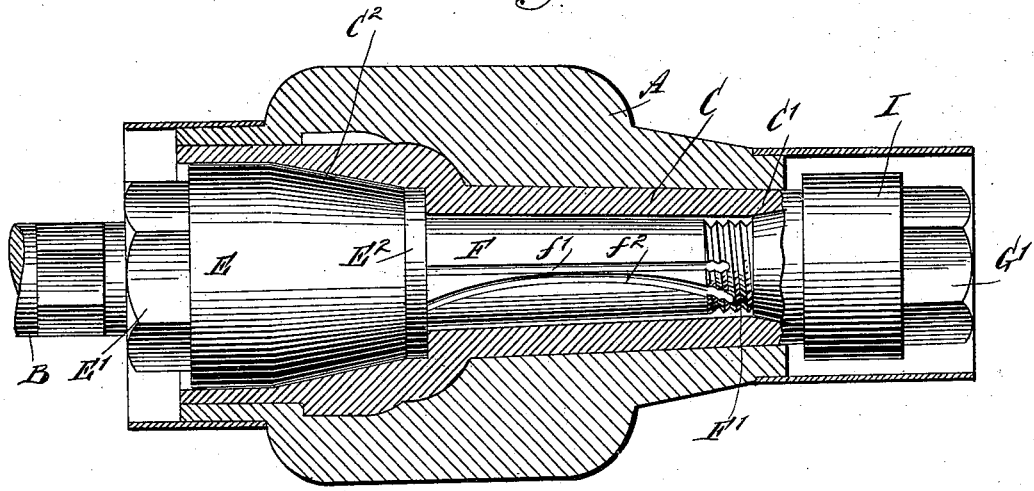
Figure 2:
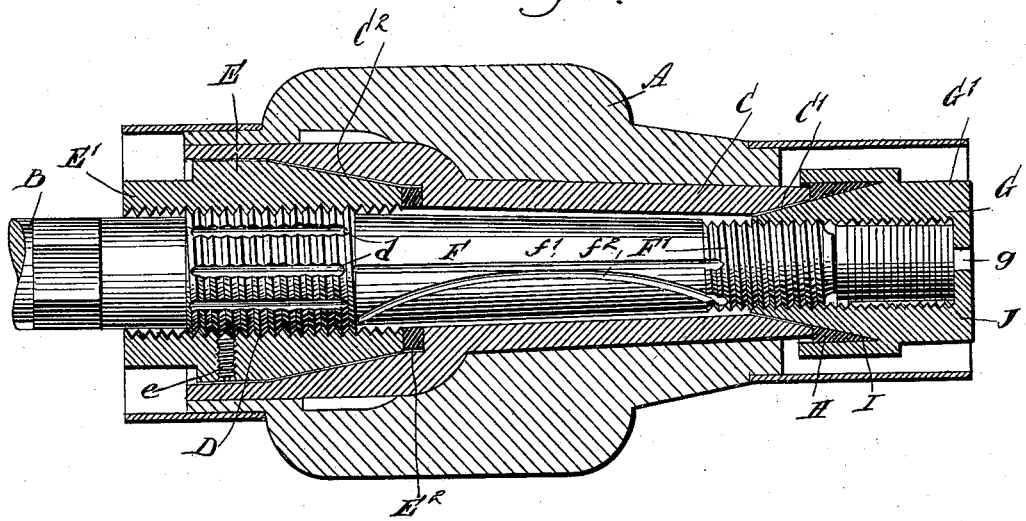

Figure 1 is a longitudinal section through the hub and its sleeve with the spindle in elevation, and Fig. 2 is a similar view showing the conical sleeve at each end of the spindle in section.

In the drawings, A represents the hub of a vehicle-wheel, and B the axle fitting therein. The hub is fitted with a sleeve or thimble C, which may be made from the ordinary thimble or be especially constructed for this particular work. The thimble at each end has conical bearing-surfaces $C'$ and $C^2$, the larger end of the cone being toward the adjacent end of the thimble.

The skein or axle at its inner end is enlarged and threaded, as shown at D. This enlarged section is also provided with a series of longitudinal slots $d$. Upon this threaded section is screwed a conical sleeve E, which is longer than the threaded section, so as to permit of considerable adjustment thereon. The outer end $E'$ of the sleeve E, or the end which projects from the inner end of the hub, is shaped so as to be engaged by a wrench in order that the same may be readily adjusted. The sleeve E is also provided with one or more set-screws $e$, the points of which engage the slots $d$ to hold the sleeve fixed upon the axle. The axle F is also threaded upon its outer end at $F'$. This threaded section is approximately of the same diameter as the central section of the axle. A sleeve G is also screwed upon this threaded section and has its inner end coned to fit the conical surface $C'$ of the skein or surrounding sleeve which is within the hub. This sleeve G is longer than is necessary to engage the threaded section. It projects some distance beyond the end of the axle and has its outer end closed except for a small hole $g$. This outer end of the sleeve forms a washer-pocket, within which is placed a series of washers J, which fill the space between the outer end of the sleeve and the outer end of the axle. These washers may be made of any convenient thickness and material, except that some of those next to the end of the axle should be of leather or other compressible material and of sufficient thickness to furnish a good wearing body and to permit a slight compression thereof.

Washers $E^2$ are inserted between the inner end of the conical sleeve E and a shoulder which is formed within the thimble C. These washers should be of compressible material to permit slight adjustment of the cone to the thimble. Washers H are inserted between the outer conical portion of the sleeve G and a ring or band I, which surrounds said sleeve and extends inward sufficiently to overlap the outer projecting end of the thimble C. These washers form a stop for all dust, preventing it from entering between the cone and the end of the thimble to the bearing-surface $C'$.

In adjusting the sleeve G upon the axle F the washers J, which occupy the washer-pocket, may be removed by inserting a pin or punch through the hole $g$. Enough washers should be inserted in this space to snugly fill the same. As this pocket is of some length, it is possible to adjust the position of the wheel upon the axle within considerable limits, so as to make the wagon-track accurate and to vary the tread thereof, if desired.

The central portion of the spindle or axle F is provided with two sets of longitudinal grooves. One of these, $f'$, is a straight groove, while the other, $f^2$, is a curved groove, the ends of the grooves being behind the central portion. As a result of this the rotation of the spindle in the thimble C will tend to force the oil from the center toward the ends in the groove $f^2$, while the straight groove $f'$ will tend to force the oil toward the center. This keeps up a constant flow of oil, which will thoroughly lubricate the bearing.

For convenience in adjusting the outer cone G its outer section G' is formed as a nut having four or six sides, as desired, and adapted to be engaged by a wrench.

Having thus described my invention, I claim as new and desire to secure by Letters Patent—

1. A spindle, having a straight longitudinal oil-groove in its outer surface, and a curved longitudinal oil-groove in the same surface, the latter having its center in advance of its ends, whereby the oil is conveyed from the center outward, substantially as described.

2. The combination, with a spindle having an enlarged and threaded section upon its inner end, which is provided with longitudinal grooves in its surface extending below the bottom of the threads, a sleeve screwing thereon, having a conical bearing-surface at the end next the center, and a set-screw adapted to engage the said grooves in the spindle, a threaded section upon the outer end of the spindle, and a sleeve screwing thereon, having a conical bearing-surface upon its inner end, of a thimble or sleeve coned at each end to fit the conical bearing-surface, and supporting the wheel-hub, substantially as described.

3. The combination, with a spindle having an enlarged and threaded section upon its inner end which is provided with longitudinal grooves in its surface extending below the bottom of the threads, a sleeve screwing thereon, having a conical bearing-surface upon the end toward the center, a set-screw passing through said sleeve and engaging the said grooves in the spindle, a threaded section upon the outer end of the spindle, a sleeve screwing thereon, having a conical bearing-surface upon its inner end, the outer end of said sleeve extending beyond the end of said spindle and forming a washer-pocket, of a thimble or sleeve coned at each end to fit the conical bearing-surfaces, and supporting the wheel-hub, substantially as described.

4. The combination, with a spindle having an enlarged and threaded section upon its inner end, a sleeve screwing thereon, having a conical bearing-surface upon the end toward the center, of a threaded section upon the outer end of the spindle, a sleeve screwing thereon, having a conical bearing-surface upon its inner end, the outer end of said sleeve being closed and extending beyond the outer end of the spindle to form a washer-pocket therein, and a thimble or sleeve coned at each end to fit the conical bearing-surfaces and supporting the wheel-hub, substantially as described.

5. The combination, with a spindle having an enlarged and threaded section upon its inner end, a sleeve screwing thereon, having a conical bearing-surface upon the end toward the center, of a threaded section upon the outer end of the spindle, a sleeve screwing thereon, having a conical bearing-surface upon its inner end, the outer end of said sleeve being closed and extending beyond the outer end of the spindle, forming a washer-pocket therein, a thimble or sleeve coned at each end to fit the conical bearing-surfaces and supporting the wheel-hub, a ring surrounding the outer end of the thimble and the conical spindle-sleeve, and washers interposed between said sleeve and cone and engaging the end of the thimble, substantially as described.

HENRY M. CROMER.

Witnesses:
CLYDE A. WELCH,
C. EUGENE TRIBBLE.